Feb. 5, 1924. 1,482,596
J. BERGE
ODOMETER MECHANISM
Filed April 14, 1919 2 Sheets-Sheet 1
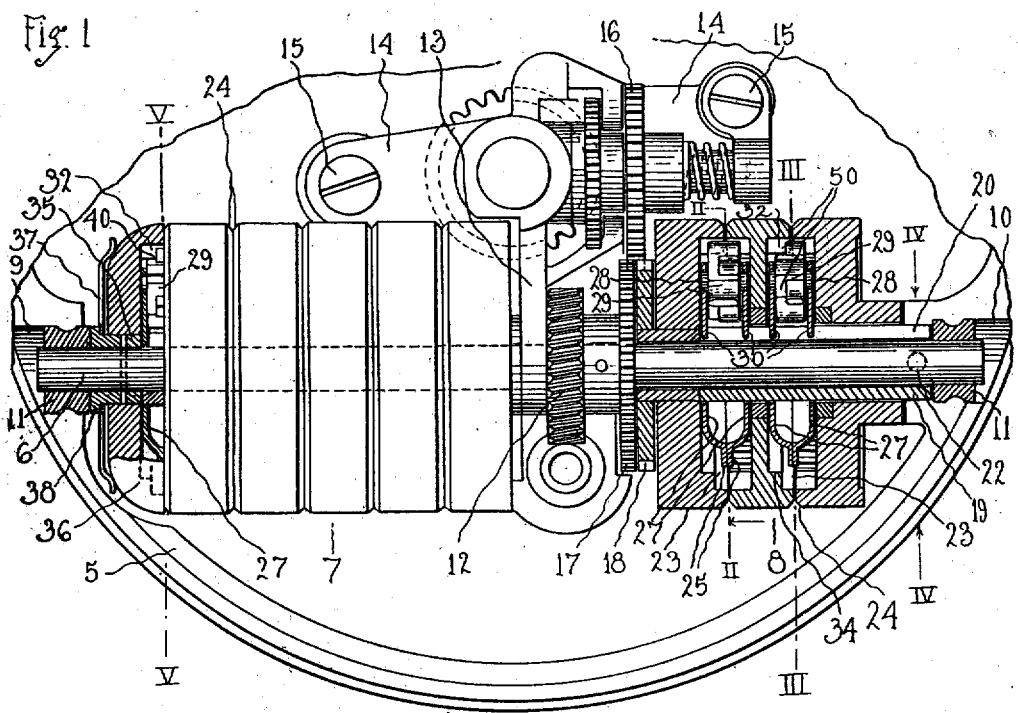
Fig. 1
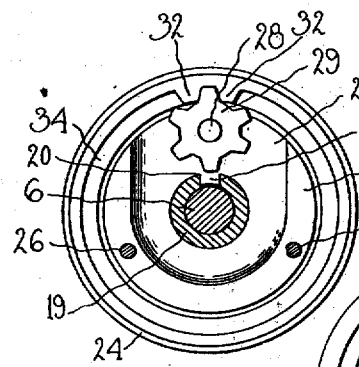
Fig. 2
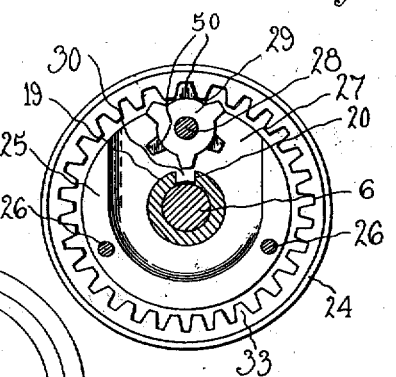
Fig. 3
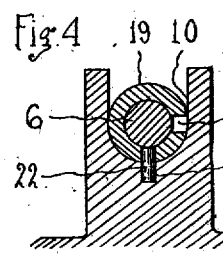
Fig. 4
Fig. 5
Inventor
Joseph Berge
By his Attorney
Lloyd Blackmore Feb. 5, 1924.
J. BERGE
ODOMETER MECHANISM
Filed April 14, 1919
1,482,596
2 Sheets-Sheet 2
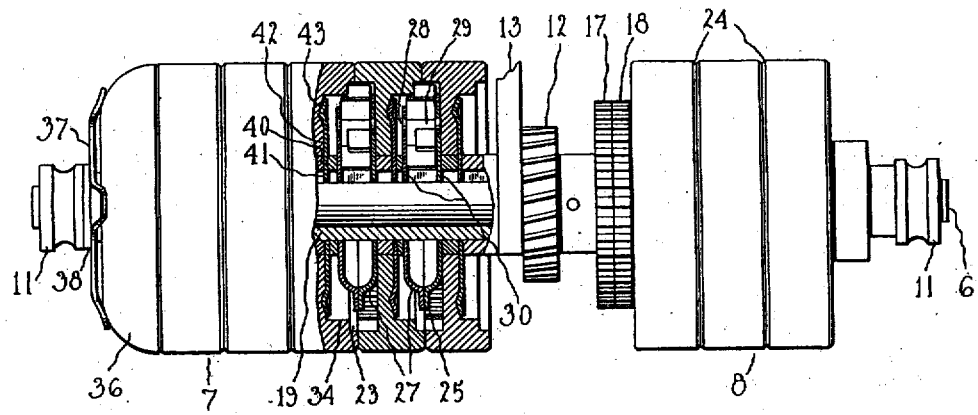
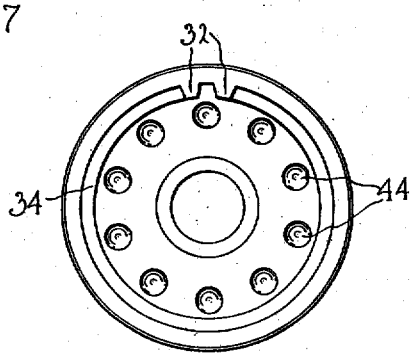
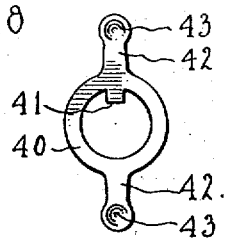
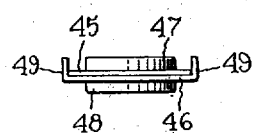
Inventor
Joseph Berge
By his Attorney
Lloyd Blackmore Patented Feb. 5, 1924.

1,482,596

UNITED STATES PATENT OFFICE.

JOSEPH BERGE, OF FLINT, MICHIGAN, ASSIGNOR TO A C SPARK PLUG COMPANY, OF FLINT, MICHIGAN, A CORPORATION OF MICHIGAN.

ODOMETER MECHANISM.

Application filed April 14, 1919. Serial No. 289,823.

*To all whom it may concern:*

Be it known that I, JOSEPH BERGE, a citizen of the United States, and resident of Flint, Genesee County, State of Michigan, have invented certain new and useful Improvements in Odometer Mechanism, of which the following is a specification.

My invention relates to odometer mechanism designed for use with an automobile or other vehicle to register the distance traveled thereby, said mechanism ordinarily including a set of trip odometer wheels which may be reset to a zero reading after each trip, or at the end of each day or other interval, and a set of total odometer wheels which register the total distance traveled during the several trips or time intervals.

This present invention relates to certain details of the odometer mechanism equally applicable to either the total or to the trip odometer wheels, and the objects thereof are to provide certain improvements in and relating to the means for supporting the several odometer wheels in proper relation with one another, to provide certain improvements in and relating to the carry-on mechanism whereby each odometer wheel of a higher order of numbers is operated intermittently from the adjacent wheel of a lower order or denomination, and to provide certain improvements in and relating to the odometer wheels themselves, all as will hereinafter and at length appear.

With the above and other objects of invention in view, my invention consists in the improved odometer mechanism illustrated in the accompanying drawing and hereinafter described and claimed, and in such variations and modifications thereof as will be obvious to those skilled in the art to which my invention relates.

In the drawing accompanying and forming a part of this specification and wherein the preferred embodiment of my invention is illustrated.

Fig. 1 is a view partly in elevation and partly in section showing my improved odometer mechanism:

Fig. 2 is a view showing a section upon a transverse plane indicated by the line II, II, Figure 1, looking to the left, the carry-on pinion being in place within the supporting member provided therefor and shown in elevation;

Fig. 3 is a similar view taken upon a transverse plane indicated by the line III, III Figure 1, looking to the right.

Fig. 4 is a view showing a section upon a transverse plane indicated by the line IV, IV, Figure 1;

Figure 5 is a view showing a section upon a transverse plane indicated by the line V, V Figure 1, looking to the left;

Fig. 6 is a sectional view showing certain of the total odometer wheels as equipped with springs for arresting them so that the numbers on them will be in line;

Fig. 7 is a view showing the inside of one of the wheels shown in Figure 6.

Figure 8 is a view showing the aligning spring for arresting the movement of the odometer wheels in proper positions; and, Figures 9 and 10 are views showing a modified form of carry on pinion supporting member.

Referring now to the drawing, the reference numeral 5 designates a portion of the shell or casing of the odometer within which the various elements thereof are contained, and 6 designates an odometer shaft which supports a plurality of total odometer discs or wheels designated collectively by the reference numeral 7, and also a plurality of trip odometer discs or wheels designated as a whole by the reference numeral 8.

The wall of the casing 5 is provided with two oppositely located U-shaped open ended seats or recesses 9 and 10 within which the ends of the shaft 6 are supported, suitable stationary bearing members 11 made of hard and wear resisting material being preferably provided within which the ends of said shaft rotate. The shaft 6 is driven by a pinion 12 secured to the central portion thereof, and which pinion is driven from a wheel of the vehicle with which the instrument is used through any suitable driving mechanism.

The central portion of the shaft 6 rotates in a bearing at the free end of an arm 13 carried by a support or bracket 14 secured in place to a wall of the casing 5 by screws 15, and which bracket serves also as a support for mechanism for resetting the trip odometer wheels 8 to a zero reading which mechanism, however, is not disclosed in detail herein, the only element or feature of said resetting mechanism necessary to an understanding of the invention to which this present application relates being a laterally shiftable resetting gear 16, which, when in position shown in Figure 1, is in mesh with two like gears 17, 18 arranged side by side and rotatable about the axis of the shaft 6, and which resetting gear when shifted to the right will mesh with the gear 18 only, and through which resetting gear motion may be communicated to the said gear 18 to reset the trip odometer wheels 8.

The pinion 12 and the gear 17 rotate in unison, and the gear 18 is operatively connected with the right hand one of the trip odometer wheels 8, from which it follows that rotary motion will be transmitted from the pinion 12 to said wheel when the parts are in the positions shown in Figure 1, the resetting gear 16 then serving in effect as an idler gear whereby the gears 17, 18 are locked together and caused to rotate in unison. It will be appreciated that the odometer wheel above referred to is the right-hand one or tenths wheel of the trip odometer group, Figure 1 of the drawing showing the mechanism as seen from a position within the instrument and looking toward the dial thereof, the trip group of wheels being located to the left of the total group of wheels in the actual instrument and the relative positions of the two groups of wheels being as here stated.

The trip odometer wheels to the right of the first one which is driven by the gear 18 are supported by and rotatable upon a hollow tubular shaft or support 19 surrounding and supported by the shaft 6, and which tubular shaft is provided with a longitudinally extending slot 20. This hollow shaft is prevented from rotating by any suitable restraining means, the right hand end thereof extending into the bearing recess or seat 10 and having a recess 21 into which a lug or key 22 provided in the bearing extends, see Figure 4, in the embodiment of my invention illustrated. The total or season odometer discs 7 are supported by and rotatable about a tubular shaft or support similar in construction and function to the tubular support 19, the right hand end thereof being connected with the arm 13 through holding means adapted to prevent its rotation with the odometer shaft 6 whereby it is supported, as will be understood.

Referring now particularly to the trip odometer wheels wherein the features to be described are the more clearly shown, although they are also present in the season odometer wheels: Each two adjacent wheels are provided with a recess, and the side faces of said wheels move in contact or substantial contact with one another at the peripheries of the wheels, whereby internal closed chambers 23 are provided between each two adjoining wheels, said chamber being formed by the two recesses which register with one another. The outer edges or corners of the side contacting faces or portions of the wheels are beveled, as shown at 24, in order to reduce the friction between successive wheels, and in order to provide groups of odometer wheels wherein the numbers upon the several wheels are individualized, and made to appear set off and distinct each from the others, without the presence of any gap or space between the wheels.

Located within each chamber 23 is a carry-on pinion supporting member made up of two like discs 25 secured together to form a unitary structure as by rivets 26, and a portion of each of which discs is bulged or offset to thereby provide walls 27 spaced apart from one another. These walls are provided with openings in line with one another through which the hollow shaft 19 extends, with other openings in line with one another and within which the ends of a shaft 28 of a carry-on pinion 29, or supporting pivots formed integrally with the carry-on pinion, are rotatably supported, and with keys 30 extending into the groove 20 of the shaft 19 whereby said supporting members are prevented from rotating about the said shaft.

A comparatively wide and stable support is thereby provided for the said carry-on pinion supporting members, and the fact that their side walls 27, which are of comparatively large area, lie close to the end walls of the chambers 23 within which they are located prevents said members from tipping or otherwise becoming displaced within their chambers. The structural features of the said supports also keep the carry-on pinions which they support in proper relation with the teeth and gears upon said wheels which co-operate with said carry-on pinion, and secure a smooth and satisfactory operation of the parts in question.

Each odometer wheel of a lower denomination or order is provided with two internal teeth 32 which engage the teeth of the carry-on wheels 29 upon each rotation of said wheel, and drive said carry-on pinion to an amount or extent sufficient to advance the odometer wheel of the next higher order or denomination one tenth of a rotation, the teeth of the carry-on pinions being in constant mesh with internal gears or teeth 33 carried by the driven or higher order wheels. Of course a wheel which lies between two others has both the two teeth and the continuous gear upon opposite sides, for it is of a higher order relative to the wheel upon one side of it, and of a lower order relative to the wheel upon the other side thereof.

In order to prevent rotation of the carry-on pinions except when they are engaged and driven by the teeth 32 portions of alternate teeth of said pinions are cut away, as shown at 50, and an internal stop ring 34 carried by each lower order or driving wheel moves past the ends of the short teeth, and through the space provided by cutting off the alternate teeth, and contacts with the faces or points of the long teeth not so cut away, to thereby lock the carry-on pinions against rotation while the said ring is moving in engagement with said last mentioned teeth and until the teeth 32 again engage and operate the said carry-on pinions.

Secured to the left hand end of the odometer shaft 6 is a driving hub 35 having flattened sides, and which hub enters a similarly shaped opening provided in a driving member 36, said member being thus driven from the said shaft and the same having two internal teeth 32 the same as the left hand one of the trip odometer wheels, said driving member forming in effect the first or shaft driven wheel of the season odometer wheels, although it has no figures, as figures, if present thereupon would indicate tenths of a mile, which is a shorter distance than it is deemed necessary to register upon the total wheels.

The driving member 36 is capable of lateral movement upon the driving hub 35, and 37 is a spring having a central opening through which the hub 35 extends and which spring acts between a projecting flange 38 upon the said hub and the driving member 36, whereby said member is forced against the left hand one of the total odometer wheels and all of said wheels are kept in contact with one another, all of said wheels being capable of movement longitudinally of the hollow shaft whereupon they are supported.

In order to insure that the individual wheels which form the trip and total sets of odometer wheels will come to rest in positions such that the numbers upon them will be in alignment, a plurality of resilient stop members, one of which is shown by itself in Figure 8, are employed; one of these stop members being shown as provided for each separate wheel, although the use of such member is the more important in the wheels remote from the driving member and at which the back lash or looseness is the greater; and in some cases said stop members are used in connection with the end wheel only of a series of odometer wheels.

Said stop members comprise a hub portion 40 having a key 41 adapted to enter the slot in the hollow tubular shafts whereby the total and trip odometer wheels are supported, as best shown in Figure 6, to thereby prevent said stop members from rotating; and resilient arms 42 extend outward from the hub 40 and are provided with cone-shaped projections 43 at their outer ends; the arms being resilient because of the fact that the entire stop member is ordinarily made from a spring material, such as hard brass.

The odometer wheels are provided with a series of circumferentially arranged depressions 44, see Figs. 6 and 7, such depressions being formed in the central webs of the wheels and their location being such that the projections 43 of the resilient stop member will enter into said depressions; whereby the movement of the odometer wheels will be arrested and the wheels themselves stopped and yieldably held in fixed position, the arrangement of the parts being such that when the projections 43 lie within the depressions 44 the figures upon the periphery of the odometer wheels will be in line.

It will be appreciated that the resilient stop members do not at all interfere with the forward movement of the several wheels, as the projections 43 readily slide out of the depression 44 when movement is transmitted from one wheel to another through the carry-on mechanism hereinbefore described. It will also be appreciated that the resilient stop members may be provided each with a single arm and projection, although it is preferable to use double arms as a better balance is secured between the parts and a smoother operation thereof secured. Furthermore, although the total odometer discs only are shown in Figures 6 and 7 as equipped with resilient stop members, it will be appreciated that the trip odometer discs may be likewise equipped with such stop members should it be deemed necessary or desirable to do so.

Figures 9 and 10 illustrate a modified method of construction of the carry-on pinion supporting member. In this form of said member two plates or discs 45, 46, functionally equivalent to the discs 25 hereinbefore described, are formed each with an off-set portion 47, 48, whereby spaced end walls are provided for supporting the ends of the carry-on pinion which the member supports, as will be understood from Figure 9. These plates or discs are secured together by bending the side edges of one of them over the edge of the side of the other, as shown at 49, thus dispensing with the use of rivets, such as the rivets 26, and providing a supporting member which may be more readily made, and the cost of which is less than is the case in the form of supporting member herein first described.

Having thus described and explained my invention what I claim as new and desire to secure by Letters Patent is:—

1. In odometer mechanism of the class described, a rotatable odometer shaft and means located centrally thereof for driving the same; bearings whereby the two ends of said shaft are supported; a third bearing for supporting the central portion of said shaft; a hollow shaft surrounding said odometer shaft and located between said central bearing and one of said end bearings; means for preventing said hollow shaft from rotating; two odometer wheels supported by and rotatable upon said hollow shaft; carry-on mechanism located between said odometer wheels and supported by said hollow shaft; and means for driving one of said odometer wheels from said odometer shaft.

2. In odometer mechanism of the class described, a rotating odometer shaft and means located centrally thereof for driving the same; bearings whereby the two ends of said shaft are supported; a third bearing for supporting the central portion of said shaft; a hollow shaft surrounding said odometer shaft and located between said central bearing and one of said end bearings; means for preventing said hollow shaft from rotating; two recessed odometer wheels supported by and rotatable upon said hollow shaft, and arranged with their peripheries in contact; a carry-on pinion support located between said odometer wheels; means for preventing rotary movement of said support relative to said hollow shaft; a carry-on pinion carried by said support, and means whereby one of said wheels is driven from the other through said pinion; and means for driving one of said wheels from said odometer shaft.

3. In odometer mechanism of the class described, a rotatable odometer shaft and means for driving the same; bearings whereby the said shaft is supported; a hollow shaft surrounding and through which said odometer shaft extends; means for preventing said hollow shaft from rotating; two recessed odometer wheels supported by and rotatable upon said hollow shaft and arranged with their peripheries in contact, to thereby provide a chamber between said wheels; a support located within said chamber; means for preventing said support from rotating upon said hollow shaft; means carried by said support whereby one of said odometer wheels is driven from the other; and means for driving one of said odometer wheels from said odometer shaft.

4. In odometer mechanism of the class described, a casing having two oppositely arranged seats formed in the side wall thereof; a rotatable odometer shaft the ends of which are rotatable in bearings supported within said seats; two odometer wheels located adjacent one another; a stationary hollow shaft supported by said odometer shaft and extending into one of said seats and having means co-operating with said seat for preventing said shaft from rotating, and upon which shaft the said wheels are rotatable, a carry-on pinion support supported by said hollow shaft and located between said odometer wheels, means for preventing said support from rotating upon said hollow shaft, a carry-on pinion supported by said support, means for driving one of said wheels from said odometer shaft, and means whereby the second of said wheels is driven from the first through said carry-on pinion.

5. In odometer mechanism of the class described, a casing having two oppositely located seats formed in the side wall thereof and which seats are open at one side; a rotatable odometer shaft the ends of which are supported in said seats; a stationary hollow shaft supported by said odometer shaft and having a longitudinally extending groove, and one end of which shaft extends into one of said seats, a key located within said seat and extending into a recess provided in said hollow shaft, two odometer wheels supported by and rotatable upon said hollow shaft, a carry-on pinion support supported by said hollow shaft and located between said wheels and having a key extending into said groove, a carry-on pinion carried by said support, means for driving one of said wheels from said odometer shaft, and means whereby the second of said wheels is driven from the first through said carry-on pinion.

6. In odometer mechanism of the class described, a carry-on pinion supporting member comprising two like discs secured together and a portion of each of which is bulged to thereby provide walls spaced apart from one another, said walls having aligned openings to receive a shaft whereby said member is supported, and other aligned openings adapted to form bearings for supporting the ends of a shaft of a carry-on pinion.

7. In odometer mechanism of the class described, a carry-on pinion supporting member having two walls spaced apart from one another, said walls having aligned openings to receive a shaft whereby said member is supported, and other aligned openings adapted to provide bearings for supporting the ends of a shaft of a carry-on pinion.

8. In odometer mechanism of the class described, a stationary supporting shaft; two recessed odometer wheels supported by said shaft and rotatable thereupon; a carry-on pinion support located within the chamber provided by said recessed wheels and capable of movement along said shaft, and which support is held against rotation by said shaft; a series of depressions provided upon one of said wheels; a resilient stop member located within the recess aforesaid and supported by and capable of movement along said shaft, and which stop member is held against rotation by said shaft and is provided with a projection adapted to enter said recesses to thereby arrest the movement of said wheel in a definite position; means for driving said first mentioned odometer wheel; and a carry-on pinion supported by said carry-on pinion support and through which the second of said odometer wheels is driven from the first.

In testimony whereof I affix my signature.

JOSEPH BERGE.